United States Patent
Sterling et al.

(10) Patent No.: US 6,794,438 B2
(45) Date of Patent: Sep. 21, 2004

(54) THERMOSET POLYMERS WITH DISPERSED FLUOROCARBON ADDITIVES

(75) Inventors: Robert E. Sterling, Homosassa SpS, FL (US); Eugene P. Goldberg, Mt. Dora, FL (US)

(73) Assignee: RES Development Corporation, Lecanto, FL (US)

( * ) Notice: Subject to any disclaimer, the term of this patent is extended or adjusted under 35 U.S.C. 154(b) by 373 days.

(21) Appl. No.: 09/978,302

(22) Filed: Oct. 17, 2001

(65) Prior Publication Data

US 2002/0068787 A1 Jun. 6, 2002

Related U.S. Application Data

(60) Provisional application No. 60/240,826, filed on Oct. 17, 2000.

(51) Int. Cl.$^7$ .................................................. C08K 5/02
(52) U.S. Cl. ..................... 524/462; 524/463; 524/500; 526/291; 526/294
(58) Field of Search ................................ 524/462, 463, 524/500; 526/291, 294

(56) References Cited

U.S. PATENT DOCUMENTS

| | | | |
|---|---|---|---|
| 3,034,509 A | 5/1962 | Bernstein et al. | |
| 3,485,787 A | 12/1969 | Haefele et al. | |
| 3,830,767 A | 8/1974 | Condon et al. | |
| 4,123,409 A | 10/1978 | Kaelble | |
| 4,386,179 A | 5/1983 | Sterling | |
| 5,128,773 A | 7/1992 | Sato | |
| 5,143,963 A | 9/1992 | Sterling et al. | |
| 5,777,061 A | * 7/1998 | Yonek et al. | ................ 528/45 |
| 5,912,291 A | 6/1999 | Sterling et al. | |

FOREIGN PATENT DOCUMENTS

| | | |
|---|---|---|
| EP | 2-22201 | 5/1987 |
| JP | 60-104161 | 6/1985 |

* cited by examiner

*Primary Examiner*—William Cheung
(74) *Attorney, Agent, or Firm*—Miles & Stockbridge P.C; Dennis P. Clarke

(57) ABSTRACT

A mixture comprising a cross-linkable thermosetting resin and a fluorocarbon additive which is curable to form a thermoset resin composition having a gradient concentration of the fluorocarbon additive through a cross-section thereof.

29 Claims, No Drawings

THERMOSET POLYMERS WITH DISPERSED FLUOROCARBON ADDITIVES

This application claims the benefit of Provisional Application No. 60/240,826, filed Oct. 17, 2000.

BACKGROUND OF THE INVENTION

1. Field of the Invention

The present invention relates to thermoset polymers modified with certain fluorocarbon additives.

2. Description of the Prior Art

It has recently been proposed to modify thermoplastic polymers by incorporating therein various oils, gums, etc.

U.S. Pat. No. 3,485,787 discloses that certain block copolymers may be extended by incorporating mineral oil therein.

U.S. Pat. No. 3,830,767 teaches that bleeding of the extending oil from the block copolymer may be prevented by incorporating a petroleum hydrocarbon wax therein.

U.S. Pat. No. 4,123,409 relates to block copolymers having thermoplastic terminal blocks and an elastomeric intermediate block. The patent discloses blending with the copolymer a high molecular weight oil which is compatible with the elastomeric block portion of the copolymer. Where the elastomeric portion is a hydrocarbon, the oil employed is a mineral oil. Where the elastomeric block is a polysiloxane, a silicone oil is blended therewith.

U.S. Pat. No. 3,034,509 discloses the addition of silicone oil to polyethylene for use as surgical tubing.

U.S. Pat. No. 4,386,179 discloses the dispersion of a polysiloxane throughout an elastomeric thermoplastic hydrocarbon block copolymer.

Japanese Patent No. 60-104,161 describes an anti-friction composite material comprising certain resins and more than 1.0% by weight of a fluorocarbon oil which have been injected molded together in a manner such that the oil exudes onto the molded surfaces of the resin due to poor compatibility of the oil with the resin and differences in viscosity between the resin and oil to produce an anti-friction surface.

European Patent Application No. 222,201 published May 20, 1987, discloses the use of certain perfluoropolyethers as additives in rubber blends vulcanizable with peroxides.

U.S. Pat. Nos. 5,143,963, 5,128,773 and 5,912,291 disclose compositions of matter formed by melt-blending a thermoplastic polymer and from 0.01% to <1.0% of a fluorocarbon additive.

There is continuing research leading to the development of novel polymeric materials, the properties of which are tailored by incorporating therein various additives.

It is an object of the present invention to provide novel thermoset polymer compositions having unique properties and which find utility in a wide variety of applications.

It is another object of the invention to provide a novel method for preparing thermoset polymer compositions having properties and characteristics heretofore unattainable.

SUMMARY OF THE INVENTION

These and other objects are realized by the present invention, one embodiment of which relates to a mixture comprising (1) a cross-linkable thermosetting resin providing composition and intimately admixed therewith, (2) from about 0.01 to about <1.0%, by weight, based on the weight of the mixture, of a fluorocarbon additive selected from the group consisting of a fluorocarbon oil, a fluorocarbon gum, a fluorocarbon grease and mixtures thereof, the fluorocarbon additive having a lower surface energy than that of the thermoset resin formed by cross-linking the composition. Where the thermoset resin is other than a phenolic or unsaturated polymer resin, the amount of fluorocarbon additive may range from about 0.01 to about 5%, by weight based on the weight of the mixture.

A second embodiment of the invention concerns a method of forming a composition of matter comprising a cross-linked thermoset resin and from about 0.01% to about <1.0% by weight, of a fluorocarbon additive selected from the group consisting of a fluorocarbon oil, a fluorocarbon gum, a fluorocarbon grease and mixtures thereof, the fluorocarbon additive having a lower surface energy than that of the resin, said method comprising intimately admixing the fluorocarbon additive with a cross-linkable thermosetting resin providing composition (I) for a time sufficient to produce a substantially homogeneous admixture comprising the resin and the fluorocarbon additive, followed by subjecting the mixture to conditions which provide a cross-linked thermoset solid resin wherein the concentration of the fluorocarbon additive through a cross-section of the solid resin composition is lower in the interior thereof and higher at the surfaces thereof. Where the thermoset resin is other than a phenolic or unsaturated polymer resin, the amount of fluorocarbon additive may range from about 0.01 to about 5%, by weight based on the weight of the mixture.

A further embodiment of the method of the invention is a method according to claim 8 including the preliminary step of forming a premix consisting of a fractional portion of the composition (I), in particulate form substantially uniformly wetted with the fluorocarbon additive and mixing the wetted first fraction with the remainder of the composition (I).

A still further embodiment of the invention is a composition of matter comprising (1) a cross-linked thermoset resin and (2) from about 0.01% to about <1.0%, by weight, based on the weight of the composition of a fluorocarbon additive selected from the group consisting of an oil, gum, grease and mixtures thereof, the additive having a lower surface energy than that of the resin, wherein the concentration of the additive through a cross-section of the solid resin composition is lower in the interior thereof and higher at the surfaces thereof. Where the thermoset resin is other than a phenolic or unsaturated polymer resin, the amount of fluorocarbon additive may range from about 0.01 to about 5%, by weight based on the weight of the mixture.

DETAILED DESCRIPTION OF THE INVENTION

Although most non-fluorinated polymers are not compatible with fluorocarbon oils and gums and are also not readily blended therewith because of the high specific gravity of the fluorocarbons, the present invention is predicated on the discovery that thermosetting resin providing compositions, when efficiently and thoroughly intimately admixed with the above-noted amounts of a fluorocarbon oil, gum or mixture thereof such that the fluorocarbon additive is homogeneously distributed throughout the composition, yield, upon subjecting the composition to conditions which result in a thermoset resin, solid compositions which, because of the differences in thermodynamic compatibility and surface energy between the fluorocarbon additive and the resin, develop higher concentrations of the additive at the surface than throughout the interior thereof.

In the phrase "concentration of fluorocarbon additive in a gradient through a cross-section from a lower value at the interior thereof to a higher value at the surfaces," the term "gradient" is not intended to suggest that the concentration varies uniformly from the center or interior of the composition to the surface. Although this may be the case with respect to some combination of polymers and additive, typically a much higher concentration of the additive is at the surfaces of the composition with a much smaller amount in the interior or bulk of the polymer.

This higher concentration of fluorocarbon additive at the surface of the polymer enables the provision of a polymer composition having heretofore unattainable properties. Thus, using very low concentrations of fluorocarbon additive, relatively high concentrations are attainable at the surface.

The high concentrations of fluorocarbon additive at the surfaces provide compositions having the advantages of fluorocarbon-like surface properties, i.e., greater hydrophobicity, lower surface energy, non-adherent surface characteristics, more chemically inert, lower friction, smoother, etc. In addition, the presence of the fluorocarbon additive enhances molding operations since it reduces "sticking" of the composition to the mold surfaces and enhances mold release. Also, the additive will, because of the lubricant properties thereof, permit higher speed processing of extruded objects, i.e., films, fibers and other objects formed therefrom and with smoother surfaces, with the added benefits of shorter injection molding cycles and higher extrusion rates.

For biological or biomedical applications of the polymer compositions, the fluorocarbon surfaces are especially advantageous since they exhibit superior biocompatibility in contact with tissue surfaces, cells, physiological fluids and blood as compared with most thermoset polymers.

For the most part, the basic bulk mechanical, physical and chemical properties of the thermoset polymer employed are retained or even enhanced for the compositions of the present invention, but acquire the fluorocarbon surface properties of the additive due to the above-noted gradient concentration of the fluorocarbon additive through a cross-section of the composition from a lower value in the bulk to a higher value at the surface. This makes the compositions of this invention also advantageous for molds such as those used for optical and electronic parts and for electro-optical or electromechanical devices which require lower surface energy and low friction surfaces.

The lower concentrations of fluorocarbon additive in the interior portion of the thermoset polymer can also advantageously modify the bulk mechanical, physical and chemical properties of the polymer, however, particularly with respect to the classes of thermoset polymers discussed hereinbelow.

A unique advantage associated with the compositions of the invention is that if cut into plural sections, the fluorocarbon additive in the interior will migrate to the new surfaces formed by the cutting operation.

A wide variety of polymers may be utilized in the practice of the invention. Preferred among the suitable resins are:

Unsaturated crosslinkable alkyl and aryl polyesters and polycarbonates, e.g., diallyl phthalate and diallyl isophthalate polymers; diethylene glycol bis(allyl carbonate); bis (phenol) A bis(allyl carbonate).

1. Bismaleimides, e.g., methylene dianiline-based bismaleimide.
2. Epoxy resins, e.g., bisphenol A—epichlorohydrin; polyglycidyl ethers of 1,4-butanediol; neopentyl glycol, trimethylolpropane or higher functionality polyols; epoxy phenol and cresol novolacs; cycloaliphatic epoxy resins.
3. Phenolic resins, e.g., phenol-formaldehyde resins.
4. Unsaturated polyesters, e.g., maleic anhydride/glycol (ethylene, propylene, diethylene, dipropylene or neopentyl glycols).
5. Crosslinkable Polyimides.
6. Crosslinkable Polyurethanes, e.g., polyisocyanate/polyol condensation products.
7. Silicones, elastomers and semi-rigid polymers based on crosslinkable alkyl and aryl silicones.
8. Urea and melamine formaldehyde resins.
9. Synthetic and natural rubbers, e.g., polyisobutylene, cis-1,4-polyisoprene, cis-1,4-polybutadiene, styrene-butadiene random copolymer, styrene-butadiene block copolymer, polychloroprene, butadiene-acrylonitrile random copolymers, all of which may be vulcanized.
10. Crosslinked Polyaryletherketones.
11. Thermoset Furan resins.

It is preferred to employ fluorocarbon additives having a surface energy substantially lower than that of the polymer with which it is compounded in order to ensure the high surface fluorine concentration described above.

Suitable fluorocarbon oils, gums and greases include fluorinated hydrocarbons and fluorinated hydrocarbon-polyetheroils, i.e., Aflunox™ and Krytox™ oils and greases, including such oils, gums and greases as perfluoropolyethylene oxide, perfluoropolypropylene oxide, polytetrafluoroethylene oligomers, perfluoropolyethylene-propylene, perfluoropolybutadiene oligomers, polyvinylidene fluoride oligomers and their copolymers, and perfluorohydrocarbon oils such as perfluorocyclohexane, perfluorohexane, perfluorododecane and higher molecular weight homologous linear or branched perfluorohydrocarbons, and perfluorinated cyclic hydrocarbons.

The preferred fluorocarbon oils, gums and greases of this invention are characterized by having viscosities in the range of 20 to more than 50,000 centistokes at 20° C., and the preferred fluorocarbon greases useful in this invention are characterized by having consistencies (as determined by ASTM D-217) in the range of NLGI grades 0–6. Preferred greases include those made by mixing or blending further oils with perfluorohydrocarbons, such as those preferred from mixtures of Krytox™ further oils with Vydax™ fluorotelomers.

The selection of a particular oil, gum or grease will depend, of course, on the intended applications of the resultant composition.

Generally, it is preferred that the fluorocarbon additive have a lower surface energy, by more than about 5 dynes/cm, as compared with the polymer with which it is compounded.

It is a particularly advantageous feature of the present invention that extremely small amounts of fluorocarbon additive may be incorporated in the thermoset polymer to achieve the highly unusual and desirable properties associated with the compositions of the invention.

By ensuring that the mixing step results in an initially homogeneous admixture of the ingredients, one is able to obtain, upon forming the thermoset resin composition, a solid composition having the above-described gradient concentration. If the ingredients are not homogeneously admixed, the product will comprise a composition wherein a substantial amount of unmixed free fluorocarbon additive simply coats the surface of the polymer. Because of the incompatibility of the F-additive and the difference in surface energies between the polymers and the fluorocarbon additive, the latter will not readily diffuse into and penetrate the polymer to any appreciable extent. Relatively uniform dispersion of the additive throughout the polymer during preparation requires homogeneous blending.

To facilitate admixing of the fluorocarbon additive with the resin forming composition where the latter is in solid form, it is preferred to mix the fluorocarbon additive into fluid premixers of prepolymers or cross-linkable resin composition. Cross-linkable prepolymers, i.e., phenolics or expoxies in the form of small particles such as pellets or powders may be used advantageously. This ensures uniform dispersion of the additive in the fluid prepolymer or efficient wetting of polymer particle surfaces prior to curing, thereby accomplishing efficient dispersion of the additive throughout the polymer.

In a preferred embodiment, the fluorocarbon additive is premixed with a fraction of fluid or pelletized prepolymer and then admixed with the remainder of the polymer and subsequently intimately admixed therewith.

We claim:

1. A mixture comprising (1) a cross-linkable thermosetting resin providing composition and intimately admixed therewith, (2) from about 0.01% to about <1.0%, by weight, based on the weight of the mixture, of a fluorocarbon additive which is substantially non-chemically reactive with said thermoset resin selected the group consisting of a fluorocarbon oil, a fluorocarbon gum, a fluorocarbon grease and mixtures thereof, said fluorocarbon additive having a lower surface energy than that of the thermoset resin formed by cross-linking said composition.

2. A composition according to claim 1 wherein said additive is an oil.

3. A composition according to claim 2 wherein said fluorocarbon oil is selected from the group consisting of fluorinated hydrocarbon polyethers and fluorinated hydrocarbons.

4. A composition according to claim 3 wherein said fluorocarbon additive is a perfluorinated polyether.

5. A composition according to claim 2 wherein said additive is perfluorinated polypropylene oxide.

6. A composition according to claim 1 wherein said additive is a gum.

7. A composition according to claim 1 wherein said additive is a grease.

8. A method of forming a composition of matter comprising a cross-linked thermoset resin and from about 0.1% to about <1.0%, by weight, of a fluorocarbon additive which is substantially non-chemically reactive with said thermoset resin selected from the group consisting of a fluorocarbon oil, a fluorocarbon gum, a fluorocarbon grease and mixtures thereof, said fluorocarbon additive having a lower surface energy than that of said resin, said method comprising intimately admixing said fluoro-carbon additive with a cross-linkable thermosetting resin providing composition (I) for a time sufficient to produce a substantially homogeneous admixture comprising said resin and said fluorocarbon additive, followed by subjecting said mixture to conditions which provide a cross-linked thermoset solid resin wherein the concentration of said fluorocarbon additive through a cross-section of said solid resin composition is lower in the interior thereof and higher at the surfaces thereof.

9. A method according to claim 8 including the preliminary step of forming a premix consisting of a fractional portion of said composition (I), in particulate form substantially uniformly wetted with said fluorocarbon additive and mixing said wetted first fraction with the remainder of said composition (I).

10. A method according to claim 8 wherein said additive is an oil.

11. A method according to claim 10 wherein said fluorocarbon oil is selected from the group consisting of fluorinated hydrocarbon polyethers and fluorinated hydrocarbons.

12. A method according to claim 11 wherein said fluorocarbon additive is a perfluorinated polyether.

13. A method according to claim 10 wherein said additive is perfluorinated polypropylene oxide.

14. A method according to claim 8 wherein said additive is a gum.

15. A method according to claim 8 wherein said additive is a grease.

16. The composition of matter produced by the method of claim 8.

17. A composition according to claim 16 wherein said additive is an oil.

18. A composition according to claim 17 wherein said fluoro-carbon oil is selected from the group consisting of fluorinated hydrocarbon polyethers and fluorinated hydrocarbons.

19. A composition according to claim 18 wherein said fluoro-carbon additive is a perfluorinated polyether.

20. A composition according to claim 17 wherein said additive is perfluorinated polypropylene oxide.

21. A composition according to claim 16 wherein said additive is a gum.

22. A composition according to claim 16 wherein said additive is a grease.

23. A composition of matter comprising (1) a cross-linked thermoset resin and (2) from about 0.1% to about <1.0%, by weight, based on the weight of the composition, of a fluorocarbon additive which is substantially non-chemically reactive with said thermoset resin selected from the group consisting of an oil, gum, grease and mixtures thereof, said additive having a lower surface energy than that of said resin, wherein the concentration of said additive through a cross-section of said solid resin composition is lower in the interior thereof and higher at the surfaces thereof.

24. A composition according to claim 23 wherein said additive is an oil.

25. A composition according to claim 24 wherein said fluoro-carbon oil is selected from the group consisting of fluorinated hydrocarbon polyethers and fluorinated hydrocarbons.

26. A composition according to claim 25 wherein said fluoro-carbon additive is a perfluorinated polyether.

27. A composition according to claim 24 wherein said additive is perfluorinated polypropylene oxide.

28. A composition according to claim 23 wherein said additive is a gum.

29. A composition according to claim 23 wherein said additive is a grease.

* * * * *